US005096612A

United States Patent [19]

Pintér et al.

[11] Patent Number: 5,096,612

[45] Date of Patent: Mar. 17, 1992

[54] MULTIPHASE SYSTEMS

[75] Inventors: János Pintér; Anna Pál née Székely; László Pap; András Szegó, all of Budapest; Katalin Mármarosi née Kellner, Biatorbágy, all of Hungary

[73] Assignee: Chinoin Gyogyszer es Vegyeszeti Termekek Gyara R.T., Budapest, Hungary

[21] Appl. No.: 266,737

[22] Filed: Nov. 3, 1988

[30] Foreign Application Priority Data

Nov. 6, 1987 [HU] Hungary ..... 4974/87
Nov. 6, 1987 [HU] Hungary ..... 4975/87

[51] Int. Cl.[5] ..... C09K 19/52
[52] U.S. Cl. ..... 252/299.01
[58] Field of Search ..... 252/299.01

[56] References Cited

U.S. PATENT DOCUMENTS 4,030,812 6/1977 Strebel ..... 252/299.61 X
4,234,437 11/1980 Friberg et al. ..... 252/299.01 X
4,600,526 7/1986 Gallot et al. ..... 252/299.01
4,767,625 8/1988 Mitsuno et al. ..... 252/299.01 X
4,888,126 12/1989 Mullen et al. ..... 252/299.5
4,898,755 2/1990 Che et al. ..... 252/299.01 X

OTHER PUBLICATIONS

J. Chem. Soc. Faraday Trans., I (1981) 77, 2057-2065.

*Primary Examiner*—Robert L. Stoll
*Assistant Examiner*—Cynthia Harris
*Attorney, Agent, or Firm*—Herbert Dubno; Jonathan Myers

[57] ABSTRACT

A graft lyotropic liquid crystalline composition having a viscosity less than 10 Pa.s comprising a low amount of surfactant(s), optionally co-surfactant(s), and/or solvents, optionally a polymer in relative stretched state and which is partly or totally penetrable by the medium and a solid material having a surface free energy of 18 to 240 mN/m.

11 Claims, No Drawings

MULTIPHASE SYSTEMS

FIELD OF THE INVENTION

The invention relates to lyotropic liquid crystalline compositions wherein formation of liquid crystalline structure is the result of an interaction (grafting) with a solid surface.

BACKGROUND OF THE INVENTION

It is generally characteristic of liquid crystalline systems that they contain a large amount of amphipatic molecules i.e. molecules (containing both hydrophobic and hydrophilic groups) beside the solvent. For example Moucharafieh and Frieberg ("First comparison between aqueous and nonaqueous lyotropic liquid crystals": Mol. Cryst. Liq. Cryst. 49 Letters 231-238, 1979) describe such regular systems wherein the amount of amphipatic material is 55% by weight if water is used as solvent and more than 45% by weight if ethylene glycol is the solvent (the balance is solvent).

Similar results were obtained in the course of our experiments. A large amount of surfactant material seems to be necessary independently on the ionogenic character of the amphipatic material. According to Tiddy et al. (J. Chem. Soc. Faraday Trans. I. 77 "Structure of liquid-crystalline phase formed by sodium dodecyl sulfate and water as determined by optical microscopy, X-ray diffraction and nuclear magnetic resonance spectroscopy") the sodium dodecyl sulfate (as a typical anionic surfactant material) forms a liquid crystalline system with water in a concentration of >67% by weight.

In addition to the large amount of the surfactant material further problems arise in connection with the liquid crystalline systems. Heusch ("Flüssig-kristalline Eigenschaften von Tensiden" Proc. VII. Intern. Congr. on Surfactants, Moscow, 1978. pp. 911-940) examined anionic, cationic and non-ionic surfactants and found that the viscosity (measured by Höppler viscosimeter) of systems having lyotropic liquid crystalline structure exceeded the upper measuring limit of the viscosimeter (=50,000 mPa.s). A system having such high viscosity cannot be used in practice or one useful only in some extreme fields, e.g. as cleaning gel.

Considerable effort has been made to develop a liquid crystalline system having a surfactant content below the lower limit of the above mentioned concentration range of 45-70% by weight. The common feature of these compositions is that they contain another amphipatic material, called co-surfactant, capillaractive material or amphiphil, in addition to the surfactant. Danielson investigates ("The association of alkyl-chain salts in apolar media", Proc. VII. Intern. Congr. on Surfactants, Moscow, 1978. pp. 1010-1037), after Ekwall, systems containing sodium octanoate as surfactant material in an amount of 6-27% by weight, 5-33% by weight of water and decanol as co-surfactant in an amount of 70-95% by weight. Considering that the decanol serves as both between a the surfactant and co-surfactant material, the result obtained is not surprising. James and Heathcock arrive at the same conclusion ("Electron and optical microscopy study of the lamellar mesophase region of the water/sodium octanoate/decanol ternary system", J. Chem. Soc. Faraday Trans. I. 77, 2857-2865 1981).

The formation of a liquid crystalline structure is very advantageous as it assures the thermodynamic stability of a composition and the sedimentation stability of the material dispersed therein. The advantageous properties of the known liquid crystalline systems, however, cannot be utilized partly due to economic reasons (attributed to the high concentration of the surfactant and/or co-surfactant materials), partly due to the extremely high viscosity (several hundred thousand mPa.s) of these compositions.

OBJECTS OF THE INVENTION

The aim of our invention is to provide systems which can assure the liquid crystalline structure by the use of a relatively low amount of surfactant and/or co-surfactant material and the viscosity of which does not exceed the value of 10 Pa.s desirable in practice.

A further object of our invention is to provide a liquid crystalline system the crystalline structure of which is locally maintained for a long time upon dilution.

DESCRIPTION OF THE INVENTION

It has been found that a liquid crystalline structure can be formed using a significantly lower amount of surfactant and/or co-surfactant materials compared to the known liquid crystalline systems containing surfactant materials, optionally co-surfactant materials and/or another solvent immiscible and/or partially miscible and/or totally miscible with the solvent, if the mixture (or solution or dispersion) of the aforementioned materials is grafted with a solid material having a surface free energy of 18 to 240 mN/m and preferably a grain size of <100 μm. Surprisingly it has been found that the viscosity of liquid crystalline system obtained by grafting is considerably lower than that of the conventional lyotropic systems. It has been found further that the lyotropic liquid crystalline layer is maintained for a long period after the dilution of the system and the decomposition thereof is slow if the system contains a polymer in an amount of 0.01-40% by mass and which polymer is in a relative stretched state and is partly or totally penetrable by the medium: $a>0.6$.

The amount of the solid grafting material is between 0.5 and 50% by weight.

The penetrability of said polymer (i.e. the rate of its tangly structure can be characterized by the a exponent of Kuhn, Mark, Houwink' relation existing between the intrinsic viscosity and the molar mass (see Rohrsetzer, S: Colloidal Chemistry, Textbook Publisher, 1986 and Shaw, D. J.: Introduction into the Colloidal and Surface Chemistry, Technical Publisher, 1986).

The liquid crystalline composition according to the invention is characterized in that it contains 0.5 to 50% by weight of solid materials or the mixture thereof having a surface free energy of 18 to 240 mN/m and a grain size of <100 μm, 5 to 55% by weight of surfactant materials or the mixture thereof having at least 8 carbon atoms, optionally 0.01 to 40% by weight of polymer the value of a of which—characteristic of the tangly structure and of penetrability by the medium—is at least 0.6, 0 to 67% by weight of water or aqueous solution of non-surfactant materials, 0 to 40% by weight of water immiscible, miscible or partly miscible solvents or the mixture thereof or the water immiscible or partly miscible organic solvent solution of non-surfactant materials, 0 to 60% by weight of co-surfactant materials or the mixture thereof and optionally other additives and the total amount of water, water immiscible, miscible or partly miscible solvents and co-surfactant materials used as auxiliary materials is 15 to 94.5% by weight.

The composition according to the invention may be prepared by grafting the solution or suspension containing, related to the total mass of composition, optionally 0.01 to 40% by mass of polymer the value of a of which—characteristic of the tangly structure and of penetrability by the medium—is at least 0.6, 5 to 55% by weight of surfactant materials or a mixture thereof having at least 8 carbon atoms, 0 to 67% by weight of water or the aqueous solution of non-surfactant materials 0 to 40% by weight of water immiscible, miscible or partly miscible solvents or the mixture thereof, 0 to 60% by weight of co-surfactant materials or the mixture thereof and optionally other additives and the total amount of water, water immiscible, miscible or partly miscible solvents and co-surfactant materials used as auxiliary materials is 15 to 94.5% by weight, with a solid material having a surface free energy of 18 to 240 mN/m and a grain size of <100 μm.

The material having a surface free energy of 18 to 240 mN/m may be prepared in the system in situ.

Alternatively the composition according to the invention may be prepared by carrying out the dissolution of the auxiliary materials and/or co-surfactants and the grafting with the solid materials simultaneously.

According to the invention the following surfactants can be used:

Anionic materials: carboxylic acid salts, e.g. fatty acid soaps; sulfates, e.g. alkyl sulfates, preferably sodium dodecyl sulfate; sulfonic acid salts, e.g. alkyl benzenesulfonates; phosphates, e.g. alkyl phosphates and their salts; esters of ethoxylated fatty alcohols prepared with inorganic acids, preferably with sulfuric acid, phosphoric acid, and their salts.

Cationic materials: ammonium salts, e.g. cetyl-trimethylammonium halides; quaternary nitrogen compounds, e.g. N-alkyl pyridinium salts; alkyl amines or the salts of alkyl amides—ethylene oxide adducts, e.g. ethoxylated coconut fatty acid amide.

Non-ionic materials: fatty acid esters of polyhydric alcohols, ethoxylated-dianhydrosorbitol-stearates, o-phosphoric acid-trialkyl esters; ethyleneoxide adducts, e.g. fatty acid—polyethylene glycol esters, fatty alcohol—ethylene oxide adducts, adducts of alkyl phenols and ethylene oxide, preferably alkyl phenol-polyglycol ether; adducts of alkyl amines or alkyl amides with ethylene oxide; adducts of polypropylene glycols with ethylene oxide; and o-phosphoric acid triesters of alkyl polyethylene glycol ethers. Amphoteric materials: preferably internal salts of betaines or phosphoric acid derivatives formed with choline.

In the compositions according to the invention the following solvents may be used: water, aliphatic and/or aromatic solvents e.g. mineral oils, low molecular ketones, mono- or polyhydric alcohols and ethers; vegetable and animal oils, saturated or unsaturated carboxylic acid having 1 to 6 carbon atoms or unsaturated carboxylic acids having more than 6 carbon atoms.

As co-surfactants alcohols, ketones and esters containing one or more polar groups; fatty alcohols, e.g. iso-octanol, dodecanol may be used.

As polymer polyelectrolytes, neutral polymers, natural macromolecules and derivatives thereof, polypeptides having an a value higher than 0.6, may be used.

As solid material having a surface free energy of 18 to 240 mN/m natural material, e.g. quartz, anatase; synthetic materials, e.g. plastic materials, basic materials of paints, etc. may be used. If the solid materials used possess biological activity, the composition according to the invention may preferably be used in the field of human and veterinary therapeutics and plant protection.

The results given in the following Examples have been obtained by using the following two methods:

the liquid crystalline structure of the compositions has been proved by polarizing microscope using crossed polarizer and analyzer, gypsum I red plate;

the degradation of structure after dilution has been followed by measuring the quantity of the released surfactant material. The degradation has also been followed by a comparative method, i.e. measuring the surface tension of the diluted composition according to the invention and that of a composition diluted to the same concentration but containing no grafting material, as a function of time.

It has been found that in each case the amount of the surfactant remaining on the surface of the solid material exceeds the rate of the adsorption by several orders of magnitude. This is proven by the difference between the measured surface tension values and by the change of the surface tension in time. We have found that the liquid crystalline layer adhered to the solid surface influences advantageously the aggregation and sedimentation stability of the solid material.

Specific Examples

The following non-limiting Examples illustrate the compositions according to the invention.

EXAMPLE 1

| | |
|---|---|
| Sodium dodecyl sulfate | 27% by weight |
| Water | 53% by weight |
| PVC K70 powder (47 mN/m; grain size d = 20–50 μm) | 20% by weight |
| ($\eta$ = 2.03 Pa.s) | |

The above composition shows a liquid crystalline structure at 33.75% by weight surfactant content, related to the liquid phase, proved by polarizing microscope. The known system containing sodium dodecyl sulfate shows liquid crystalline structure at a sodium dodecyl sulfate concentration above 67% by mass.

EXAMPLE 2

| | |
|---|---|
| Nonyl phenol polyglycol ether (10 EO) | 30% by weight |
| Water | 60% by weight |
| Anatase (85 mN/m; d = 12–20 μm) | 10% by weight |
| ($\eta$ = 1.18 Pa.s) | |

The above composition shows a lyotropic liquid crystalline structure at 33.33% by weight of surfactant content (related to the liquid phase), proved by polarizing microscope. According to literature data the nonyl phenol polyglycol ether (10 EO) forms a liquid crystalline structure in water at a concentration of 55%, according to our experiment at a concentration of 58% by weight.

EXAMPLE 3

| | |
|---|---|
| Ethoxylated anhydrosorbitol monostearate | 32.5% by weight |
| Lead (240 m/Nm; d = 10–75 μm) | 0.5% by weight |
| Water | 67% by weight |
| ($\eta$ = 1.67 Pa.s) | |

The above composition shows a liquid crystalline structure at 32.7% by weight of surfactant related to the medium, which is proved by microscope. The surfactant forms liquid crystalline structure without grafting at a concentration above 40% by weight.

EXAMPLE 4

| | |
|---|---|
| Sodium dodecyl sulfate | 51% by weight |
| Water | 29% by weight |
| Polytetrafluorethylene (PTFE) (Teflon ®) (18 mN/m; d = 5-8 μm) | 20% by weight |
| (η = 2.17 Pa.s) | |

The sodium dodecyl sulfate forms a liquid crystalline structure in water at a concentration >67% by weight, while the above composition shows the liquid crystalline structure at a concentration of 63.7% by weight.

EXAMPLE 5

| | |
|---|---|
| Ethoxylated $C_{12}$–$C_{16}$ fatty alcohol (EO = 4) | 20% by weight |
| Water | 32% by weight |
| n-Hexadecane | 8% by weight |
| Quartz (120 mN/m; d = 1-5 μm) | 40% by weight |
| (η = 2.70 Pa.s) | |

The system used as control contains 40% by weight of above ethoxylated fatty alcohol, 50% by weight of water and 10% by weight of n-hexadecane. The above composition contains 33.3% by weight of surfactant 53.3% by mass of water and 13.3% by mass of n-hexadecane, related to the liquid phase. The liquid crystalline structure can be proved by microscopic examination.

EXAMPLE 6

| | |
|---|---|
| Sodium dodecyl sulfate | 20% by weight |
| N-dodecyl alcohol | 20% by weight |
| n-Dodecane | 20% by weight |
| Water | 20% by weight |
| PVC K70 powder (47 mN/m; d = 20-56 μm) | 20% by weight |
| (η = 1.13 Pa.s) | |

The system without grafting shows the liquid crystalline structure at the following composition: 40% by mass of sodium dodecyl sulfate, 20% by weight of n-dodecyl alcohol, 20% by mass of n-dodecane, 20% by weight of water. The above composition according to the invention contains only 20% by weight of each mentioned component. The liquid crystalline structure is proved in both cases by microscopic. examination.

EXAMPLE 7

| | |
|---|---|
| Ethoxylated anhydrosorbitol monostearate | 5% by weight |
| Sodium dodecyl sulfate | 5% by weight |
| Ethanol | 40% by weight |
| n-Hexanol | 5% by weight |
| n-Dodecanol | 5% by weight |
| Quartz (120 mN/m; d = 1-5 μm) | 40% by weight |
| (η = 2.18 Pa.s) | |

The composition of the system without grafting and having a liquid crystalline structure is as follows: 20% by weight of ethoxylated anhydrosorbitol monostearate, 13% by weight of sodium dodecyl sulfate, 10% by weight of n-hexanol, 10% by weight of dodecanol and 47% by weight of ethanol. The above composition (calculated for the liquid phase) contains 8.3% by weight of each surfactant and co-surfactant and 66.7% by weight of ethanol. Both structures are proved by microscope.

EXAMPLE 8

| | |
|---|---|
| Cetyl-trimethylammonium bromide | 35% by weight |
| Water | 45% by weight |
| Quartz (120 mN/m; d = 1-5 μm) | 20% by weight |
| (η = 0.59 Pa.s) | |

The cetyl-trimethylammonium bromide forms in water liquid crystalline structure at a concentration of 56% by weight, while the above composition forms the lyotropic system at a concentration of 43.7% by weight, calculated for the liquid phase.

EXAMPLE 9

| | |
|---|---|
| Ethoxylated anhydrosorbitol tristearate | 10% by weight |
| Isooctanol | 60% by weight |
| Ethylene glycol | 10% by weight |
| Anatase (85 mN/m, d = 12-20 μm) | 20% by weight |
| (η = 1.76 Pa.s) | |

The ethoxylated anhydrosorbitol tristearate forms liquid crystalline phase in the mixture of isooctanol and ethylene glycol only at the concentration of 40% by weight. The above composition contains 12.5% by weight of surfactant calculated for the liquid phase.

EXAMPLE 10

| | |
|---|---|
| Ethoxylated anhydrosorbitol tristearate | 3% by weight |
| Sodium dodecyl sulfate | 3% by weight |
| Water | 20% by weight |
| n-Dodecanol | 24% by weight |
| Quartz (120 mN/m; d = 1-5 μm) | 50% by weight |
| (η = 1.28 Pa.s) | |

The mixture of sodium dodecyl sulfate and ethoxylated anhydrosorbitol tristearate (1:1) forms a lyotropic liquid crystalline system with water in the presence of n-dodecanol without grafting with quartz only at a concentration of >24% by weight.

EXAMPLE 11

| | |
|---|---|
| Ethoxylated castor oil (EO = 35) | 20% by weight |
| Calcium dodecyl benzenesulfonate | 35% by weight |
| n-Butanol | 25% by weight |
| Paraffin oil (pharmacopeia) | 10% by weight |
| PTFE (18 mN/m; d = 5-8 μm) | 10% by weight |
| (η = 0.78 Pa.s) | |

The above composition has a liquid crystalline structure, which is proved by microscope. A composition without PTFE forms only a regular structure if the amount of the ethoxylated castor oil is increased by 10% by weight.

EXAMPLE 12

| | |
|---|---|
| Ethoxylated anhydrosorbitol tristearate | 10% by weight |
| Water | 10% by weight |
| Cholesterol | 5% by weight |
| n-Dodecane | 50% by weight |

-continued

| | |
|---|---|
| Anatase (85 mN/m; d = 12–20 μm) (η = 1.59 Pa.s) | 15% by weight |

The cholesterol is added to the system dissolved in the water. The composition is a lyotropic liquid crystal showing under the microscope a lamellar liquid crystalline structure.

EXAMPLE 13

| | |
|---|---|
| Ethylene oxide-propylene oxide block oligomer (corresponding to the type Genapol PF 10) | 13% by weight |
| Water | 65% by weight |
| Caffein | 7% by weight |
| Polyethylene (21 mN/m; d = 10–30 μm) (η = 1.5 Pa.s) | 15% by weight |

The caffein is dissolved in the water and the other ingredients are admixed in this solution. The composition thus obtained shows under microscope a radially arranged lyotropic liquid crystalline structure.

EXAMPLE 14

| | |
|---|---|
| Ethoxylated anhydrosorbitol tristearate | 10% by weight |
| Water | 20% by weight |
| Cholesterol | 5% by weight |
| n-Dodecane | 30% by weight |
| Butyl acetate | 20% by weight |
| Anatase (85 mN/m; d = 12–20 μm) | 15% by weight |

The cholesterol is dissolved in the mixture of n--dodecane and butyl acetate and the solution thus obtained is added to the system. The composition obtained is a lyotropic liquid crystal showing under the microscope a lamellar lyotropic liquid crystalline structure.

EXAMPLE 15

| | |
|---|---|
| Sodium dodecyl sulfate | 25% by weight |
| Water | 54% by weight |
| Polyvinylpyrrolidone (M = 25,000; a = 0.85) | 1% by weight |
| PVC K70 powder (47 mN/m; d = 20–56 μm) | 20% by weight |

EXAMPLE 16 (COUNTER EXAMPLE)

| | |
|---|---|
| Sodium dodecyl sulfate | 25% by weight |
| Water | 54% by weight |
| Polyvinylpyrrolidone (M = 1 × $10^6$, a = 0.52) | 1% by weight |
| PVC K70 powder (47 mN/m; d = 20–56 μm) | 20% by weight |

Both compositions are lyotropic liquid crystals, but the composition of the counter Example does not show a liquid crystal layer bound to the solid particles after a dilution with water to a concentration of 5% by weight. In case of the composition of Example 25, diluted to the same concentration, however, 65% of the surfactant remains bound 60 minutes after the dilution.

EXAMPLE 17

| | |
|---|---|
| Ethoxylated anhydrosorbitol monostearate | 5% by weight |
| Water | 44.99% by weight |
| Poly(L) glutamic acid (M = 10,000, a = 1.115) | 0.01% by weight |
| Quartz (120 mN/m; d = 1–5 μm) | 50% by weight |

The above composition is a lyotropic liquid crystal, the adhered layer contains 28% of the starting tenside after 60 minutes.

EXAMPLE 18

| | |
|---|---|
| Nonyl phenol polyglycol ether (EO = 10) | 10% by weight |
| Water | 40% by weight |
| Polyethylene oxide (M = 1,000, a = 0.82) | 40% by weight |
| PTFE (18 mN/m; d = 5–8 μm) | 10% by weight |

EXAMPLE 19 (COUNTER EXAMPLE)

| | |
|---|---|
| Nonyl phenol polyglycol ether | 10% by weight |
| Water | 40% by weight |
| Polyethylene oxide (M = 1,000, a = 0.82) | 40% by weight |
| PTFE (18 mN/m; d = 5–8 μm) | 10% by weight |

In case of the composition of Example 18 the adhered layer contains 72% of the surface tension reducing components after 60 minutes a 20-fold dilution with water, while the composition according to the counter Example retains only less than 10% of the surfactant.

EXAMPLE 20

| | |
|---|---|
| Octadecyl trimethylammonium bromide | 16% by weight |
| Water | 50% by weight |
| Polyethylene oxide (M = 1,000, a = 0.82) | 25% by weight |
| Polyvinylalcohol (M = 18,000, a = 0.77) | 5% by weight |
| Isopropanol | 4.5% by weight |
| Lead (240 mN/m; d = 10–76 μm) | 0.5% by weight |

The composition is a liquid lyotropic crystal. In the diluted system (5 ml composition dispersed in 100 ml water) the amount of the bound surfactant material is 65% 60 minutes after the dilution.

EXAMPLE 21

| | |
|---|---|
| Ethoxylated $C_{12}$–$C_{16}$ fatty alcohol (EO = 15) | 15% by weight |
| Water | 67% by weight |
| Polyacrylic acid sodium salt (M = 25,000, a = 1.08) | 5% by weight |
| Anatase (85 mN/m; d = 12–20 μm) | 13% by weight |

The composition is a lyotropic liquid crystal. In the diluted system (5 g composition dispersed in 100 ml of water) the amount of the bound surfactant material is 90% 60 minutes after the preparation.

EXAMPLE 22

| | |
|---|---|
| Ethoxylated anhydrosorbitol monostearate | 9.5% by weight |
| Water | 40% by weight |
| Isopropanol | 20% by weight |
| Ethylene glycol | 20% by weight |
| Polyvinylalcohol (M = 78,000, a = 0.77) | 0.25% by weight |
| Polyvinylpyrrolidone | 0.25% by weight |
| PVC K70 powder (47 mN/m; d = 20–56 μm) | 10% by weight |

The composition is a lyotropic liquid crystal which retains 55% of the surfactant material 60 minutes after 3-fold dilution with water.

EXAMPLE 23

| | |
|---|---|
| Ethoxylated castor oil (EO = 35) | 15% by weight |
| n-Hexanol | 40% by weight |
| n-Dodecanol | 20% by weight |
| n-Dodecane | 20% by weight |
| Polyethylene imine (M = 12,000, a = 0.89) | 2% by weight |
| Quartz (120 mN/m; d = 1-5 μm) | 3% by weight |

The composition is a lyotropic liquid crystal. 60 minutes after a 20-fold dilution with water 30% of the surfactant material remains adhered to the solid surface.

EXAMPLE 24

| | |
|---|---|
| Sodium dodecyl sulfate | 51% by weight |
| Water | 42% by weight |
| Polyacrylic acid (M = 50,000, a = 0.91) | 0.25% by weight |
| Oligodextrane (M = 2,000, a = 0.60) | 0.25% by weight |
| PVC K70 powder (47 mN/m; d = 20-56 μm) | 6.5% by weight |

The composition is a lyotropic liquid crystal. 60 minutes after a 20-fold dilution with water 25% of the surfactant remains bound.

EXAMPLE 25

| | |
|---|---|
| Ethoxylated anhydrosorbitol tristearate | 20% by weight |
| Water | 40% by weight |
| Polyacrylamide (M = 10,000, a = 0.84) | 10% by weight |
| Quartz (120 mN/m; d = 1-5 μm) | 20% by weight |

The composition is a lyotropic liquid crystal. 60 minutes after a 20-fold dilution 70% of the surfactant remains bound.

EXAMPLE 26

| | |
|---|---|
| Ethoxylated tallow amine (EO = 25, amine value: 0.75) | 10% by weight |
| Water | 49.5% by weight |
| Polyacrylamide (M = 5 × 10^6, a = 0.80) | 0.5% by weight |
| Quartz (120 mN/m; d = 1-5 μm) | 40% by weight |

The composition is a lyotropic liquid crystal. 60 minutes after a 20-fold dilution with water 92% of the surfactant remains bound.

EXAMPLE 27

| | |
|---|---|
| Ethylene oxide - propylene oxide block oligomer (corresponding to the type of Genapol PF 10) | 10% by weight |
| Water | 68% by weight |
| Coffein | 5% by weight |
| Oligodextrane (M = 2,000, a = 0.6) | 2% by weight |
| Polyethylene (21 mN/m; d = 30 μm) | 15% by weight |

The composition is a lyotropic liquid crystal. The lyotropic structure remains on the surface of the solid material after a 6-fold dilution with water. 60 minutes after the dilution 55% of the surfactant is in a bound state. When preparing the composition the aqueous solution of coffein was used as starting material.

EXAMPLE 28

| | |
|---|---|
| Ethoxylated anhydrosorbitol tristearate | 10% by weight |
| Ethylene glycol | 20% by weight |
| Dodecane | 50% by weight |
| Cholesterol | 5% by weight |
| Polyethylene oxide - porpylene oxide (M = 10,000, a = 0.84) | 5% by weight |
| Anatase (85 mN/m; d = 12-30 μm) | 10% by weight |

When preparing the composition the aqueous solution of cholesterol was used as starting material. Under microscope the composition shows a lamellar lyotropic structure. After dilution with water (1:25) the bound structure remains on the surface of the particles. 60 minutes after the dilution 40% of the surfactant is bound.

EXAMPLE 29

| | |
|---|---|
| Ethoxylated anhydrosorbitol tristearate | 10% by weight |
| Ethylene glycol | 20% by weight |
| Dodecane | 50% by weight |
| Cholesterol | 5% by weight |
| Polyethylene oxide - propylene oxide (M = 10,000, a = 0.84) | 5% by weight |
| Anatase (85 mN/m; d = 12-30 μm) | 10% by weight |

When preparing the composition the ethylene glycol solution of cholesterol was used as starting material. Under microscope the composition shows a lamellar lyotropic structure. After dilution with water (1:25) the bound structure remains on the surface of the particles. 60 minutes after the dilution 40% of the surfactant is bound.

What we claim is:

1. A graft lyotropic liquid crystalline composition having a viscosity less than 10 PaS, which comprises:
   (a) 5 to 55% by weight of a surfactant having at least 8 carbon atoms;
   (b) up to 67% by weight of water or an aqueous solution of a non-surface active material;
   (c) up to 40% by weight of a water-immiscible, miscible or partially miscible organic solvent solution;
   (d) up to 60% by weight of a cosurfactant selected from the group consisting of a ketone, ester, fatty alcohol, and mixtures thereof, wherein the total amount of the water and the water-immiscible, miscible and partially miscible organic solvents and the cosurfactant is 15 to 94.5% by weight of the lyotropic liquid crystalline composition, and which together with the surfactant having at least 8 carbon atoms form a suspension or solution; and
   (e) 0.5 to 50% by weight of a solid material having a surface free energy of 18 to 240 mN/m and a grain size of less than 100 microns, said solid material grafted onto said surfactant contained in suspension or solution to form the lyotropic liquid crystal.

2. The composition defined in claim 1 further comprising a water soluble polymer in an amount of 1 to 40% by weight.

3. The composition defined in claim 1 further comprising a mixture of non-ionic polymers, the total amount of which is 0.5 to 30% by weight.

4. The composition defined in claim 1 further comprising a totally dissociated ionic polymer in an amount of 0.01 to 5% by weight.

5. The composition defined in claim 1 further comprising a partially dissociated water soluble polymer or a mixture of water soluble polymers in an amount of 0.5 to 20% by weight.

6. The composition defined in claim 1 further comprising a mixture of non-ionic polymers in an amount of 0.5 to 20% by weight.

7. The composition defined in claim 1 comprising a non-ionic surfactant or a mixture of non-ionic surfactants in an amount of 5 to 35% by weight as the surfactant having at least 8 carbon atoms.

8. The composition defined in claim 1 comprising an ionic surfactant or a mixture of non-ionic surfactants in an amount of 20 to 51% by weight as the surfactant having at least 8 carbon atoms.

9. The composition defined in claim 1 comprising a mixture of ionic and non-ionic surfactants in an amount of 6 to 55% by weight as the surfactant.

10. The composition defined in claim 1 comprising a mixture of amphoteric, and ionic or non-ionic surfactants in an amount of 6 to 55% by weight as the surfactant.

11. The composition defined in claim 1 comprising as the solid material having a surface free energy of 18 to 240 mN/m and a grain size less than 100 microns, a compound selected from the group consisting of quartz, anatase, polyvinylchloride, lead, polytetrafluoroethylene, and polyethylene.

* * * * *